(12) United States Patent
Yuasa et al.

(10) Patent No.: US 11,141,901 B2
(45) Date of Patent: Oct. 12, 2021

(54) MOLDED RESIN STRAND, METHOD FOR MODELING THREE-DIMENSIONAL OBJECT, AND METHOD FOR MANUFACTURING MOLDED RESIN STRAND

(71) Applicant: Kyoraku Co., Ltd., Kyoto (JP)

(72) Inventors: Ryohei Yuasa, Kanagawa (JP); Takashi Nomura, Kanagawa (JP); Naoki Ueda, Kyoto (JP)

(73) Assignee: Kyoraku Co., Ltd., Kyoto (JP)

( * ) Notice: Subject to any disclaimer, the term of this patent is extended or adjusted under 35 U.S.C. 154(b) by 274 days.

(21) Appl. No.: 15/562,516

(22) PCT Filed: Mar. 31, 2016

(86) PCT No.: PCT/JP2016/060721
§ 371 (c)(1),
(2) Date: Sep. 28, 2017

(87) PCT Pub. No.: WO2016/159259
PCT Pub. Date: Oct. 6, 2016

(65) Prior Publication Data
US 2018/0093413 A1    Apr. 5, 2018

(30) Foreign Application Priority Data
Mar. 31, 2015 (JP) .................................. 2015-073475
Mar. 31, 2015 (JP) ............................. JP2015-074001

(51) Int. Cl.
*B29C 64/118*    (2017.01)
*B29C 48/21*    (2019.01)
(Continued)

(52) U.S. Cl.
CPC .............. *B29C 48/21* (2019.02); *B29C 48/02* (2019.02); *B29C 48/022* (2019.02); *B29C 48/05* (2019.02);
(Continued)

(58) Field of Classification Search
CPC ...................................................... B29C 64/118
See application file for complete search history.

(56) References Cited

U.S. PATENT DOCUMENTS 3,887,365 A * 6/1975 Sherfey ..................... B22F 3/00
419/2
4,056,591 A * 11/1977 Goettler ................. B29C 48/30
264/108

(Continued)

FOREIGN PATENT DOCUMENTS

EP    1063070 A2    12/2000
JP    4107960 B2    6/2008

(Continued)

OTHER PUBLICATIONS

International Search Report dated Jul. 5, 2016 filed in PCT/JP2016/060721.

(Continued)

*Primary Examiner* — Andrew T Piziali
(74) *Attorney, Agent, or Firm* — Maier & Maier, PLLC

(57) ABSTRACT

A molded resin strand includes a first layer containing thermoplastic resin, and a second layer covering the first layer and containing thermoplastic resin exhibiting physical properties different from those of the first layer. For example, the second layer is melt-extruded with the second layer covering the first layer. A three-dimensional object is modeled by lamination deposition by fusion between adjacent second layers. In a molded resin strand manufacturing method, a melt-kneaded resin material is continuously (Continued)

extruded from a ferrule of an extruder. The extruded molded resin strand is vacuum-sucked while passing through a sizing device. Subsequently, the molded resin strand is wound up after cooling solidification. The sizing device is provided with a space having a circular cross section, and a surface of the sizing device facing the space is provided with a plurality of vacuum suction grooves.

9 Claims, 5 Drawing Sheets

(51) Int. Cl.
    *B29C 48/05*     (2019.01)
    *B29C 48/18*     (2019.01)
    *B29C 48/00*     (2019.01)
    *B33Y 70/00*     (2020.01)
    *B29C 67/00*     (2017.01)
    *B29C 64/314*     (2017.01)
    *B29C 48/90*     (2019.01)
    *B29C 48/02*     (2019.01)
    *B29C 48/25*     (2019.01)
    *C08J 5/04*     (2006.01)
    *C08L 55/02*     (2006.01)
    *B29K 507/04*     (2006.01)
    *B29K 105/16*     (2006.01)
    *B29C 48/92*     (2019.01)
    *B29C 64/209*     (2017.01)
    *B29K 509/00*     (2006.01)
    *B29C 48/49*     (2019.01)
    *B29K 55/02*     (2006.01)

(52) U.S. Cl.
CPC ............ *B29C 48/18* (2019.02); *B29C 48/266* (2019.02); *B29C 48/905* (2019.02); *B29C 48/908* (2019.02); *B29C 64/118* (2017.08); *B29C 64/314* (2017.08); *B29C 67/00* (2013.01); *B33Y 70/00* (2014.12); *C08J 5/042* (2013.01); *C08L 55/02* (2013.01); *B29C 48/49* (2019.02); *B29C 48/92* (2019.02); *B29C 64/209* (2017.08); *B29C 2948/92123* (2019.02); *B29C 2948/92438* (2019.02); *B29C 2948/92619* (2019.02); *B29C 2948/92942* (2019.02); *B29K 2055/02* (2013.01); *B29K 2105/16* (2013.01); *B29K 2507/04* (2013.01); *B29K 2509/00* (2013.01); *B29K 2995/007* (2013.01)

(56) References Cited

U.S. PATENT DOCUMENTS

| | | | |
|---|---|---|---|
| 2001/0030383 A1 | 10/2001 | Swanson et al. | |
| 2004/0131823 A1* | 7/2004 | Rodgers | ............... B29C 48/022 428/100 |
| 2004/0131853 A1 | 7/2004 | Mushiake et al. | |
| 2005/0004282 A1 | 1/2005 | Priedeman, Jr. et al. | |
| 2007/0003656 A1 | 1/2007 | LaBossiere et al. | |
| 2009/0295032 A1 | 12/2009 | Hopkins | |
| 2011/0074065 A1 | 3/2011 | Batchelder et al. | |
| 2012/0070619 A1 | 3/2012 | Mikulak et al. | |
| 2012/0231225 A1 | 9/2012 | Mikulak et al. | |
| 2014/0134335 A1 | 5/2014 | Pridoehl et al. | |
| 2014/0291886 A1* | 10/2014 | Mark | .................... B29C 70/384 264/163 |
| 2016/0009030 A1 | 1/2016 | Mark | |

FOREIGN PATENT DOCUMENTS

| | | |
|---|---|---|
| JP | 2009-500194 A | 1/2009 |
| JP | 2010-521339 A | 6/2010 |
| JP | 5039549 B2 | 10/2012 |
| WO | 2014/072148 A1 | 5/2014 |
| WO | 2014/153535 A2 | 9/2014 |

OTHER PUBLICATIONS

Supplementary partial European Search Report dated Oct. 17, 2018 for the corresponding European Patent Application No. 16773139.7.
Chinese Office Action for corresponding Application No. 201680018275.5 dated Jan. 17, 2019.
"Plastic Molding Process and Plastic Mold Design", ISBN 7-111-34715-3, Aug. 2014.

* cited by examiner

MOLDED RESIN STRAND, METHOD FOR MODELING THREE-DIMENSIONAL OBJECT, AND METHOD FOR MANUFACTURING MOLDED RESIN STRAND

CROSS-REFERENCE TO RELATED APPLICATIONS

This is a U.S. national phase application under 35 U.S.C. § 371 of International Patent Application No. PCT/JP2016/060721, filed Mar. 31, 2016, and claims benefit of priority to Japanese Patent Application No. 2015-073475, filed Mar. 31, 2015 Japanese Patent Application No. 2015-074001, filed Mar. 31, 2015. The entire contents of these applications are hereby incorporated by reference.

FIELD OF TECHNOLOGY

The present invention relates to a molded resin strand used as a modeling material in a modeling device configured to build a three-dimensional object (a cubic object), such as a so-called 3D printer. Further, the present invention relates to a three-dimensional object modeling method and a molded resin strand manufacturing method using the molded resin strand.

BACKGROUND

A so-called 3D printer has attracted attention as a method for forming a three-dimensional object. Complicated three-dimensional objects considered as impractical so far can be also easily produced. With the 3D printer, an optional material such as resin or metal is stacked up so that even a shape unrealizable by a normal method can be processed.

Some techniques of the 3D printer have been known. Of these techniques, the technique (fused deposition modeling) of extruding and laminating/depositing a resin strand (a strand body) has been developed in various fields because of its advantage in the aspect of cost (see JP-T-2009-500194; JP-T-2010-521339).

For example, in a lamination modeling system disclosed in JP-T-2009-500194, a filament as a modeling material is supplied to an extruding head. The filament is melted at a liquefier mounted on the extruding head. The melted filament is extruded onto a base through a nozzle. The extruding head and the nozzle moves relative to each other to form a 3D model. Many strand-shaped and layer-shaped materials are laminated, and in this manner, the 3D model is manufactured.

JP-T-2010-521339 discloses the method for building a 3D object. This method includes delivering out a modified ABS material to an extruding head of a system for lamination deposition by extrusion, melting the delivered modified ABS material at the extruding head under conditions for improving a response time of the extruding head, and depositing, for each layer, a melted thermoplastic plastic material to form the 3D object.

In the method of this type, melting deposition of a resin material is a basic concept. A resin strand (a resin strand body) is used as a raw material. Japanese Patent No. 5039549 and Japanese Patent No. 4107960 each disclose, e.g., a resin strand used as a raw material and the method for supplying the resin strand.

Japanese Patent No. 5039549 discloses a composition for producing a three-dimensional object. In an extruder configured to produce a modeled object, a flexible filament is supplied to an extruding head. The filament is melted in a liquefier carried by the extruding head. The liquefier heats the filament to a temperature slightly higher than a solidification point, and therefore, the filament is brought into a melted state. The melted material is extruded onto a seat through an orifice of the liquefier.

Japanese Patent No. 4107960 discloses a filament cassette for supplying a filament in a three-dimensional deposition modeling machine and a filament cassette receiver. In Japanese Patent No. 5039549, the method for engaging the filament with the modeling machine and separating the filament from the modeling machine by a simple configuration is provided. This method can be realized by the configuration of protecting the filament from moisture in environment.

SUMMARY

The typical molded resin strand (the filament disclosed in JP-T-2009-500194) used for the 3D printer employing fused deposition modeling is a modeling material having a single layer, and does not have the functionality of further improving mechanical aptitude and quality for the 3D printer. Thus, there are problems that this molded body curves or bends in the middle of modeling in the 3D printer and that the quality of the molded body deteriorates due to moisture absorption after unsealing. Further, there is another problem that it is difficult to perform modeling with a material with a high fluidity in fused deposition modeling.

In the technique of laminating/depositing the three-dimensional object in such a manner that the resin strand is melted while being supplied to the extruding head, it is important that the diameter of the resin strand to be used is constant and that the shape of such a resin strand is close to a true circle. This is because of the following reasons: when the diameter or shape of the resin strand to be used changes, the amount of resin supplied from the extruding head changes, leading to lowering of the accuracy of shaping of the built three-dimensional object.

Generally, the resin strand is manufactured in such a manner that a melt-kneaded resin material is continuously extruded from a ferrule of the extruder and is wound up after cooling solidification. The strand diameter or the strand shape might vary according to extrusion conditions or wind-up conditions, and it is difficult to avoid such a situation. It is a fact that little attention has been given to the diameter and shape of the resin strand so far.

For solving the above-described problems, the present invention is intended to provide a molded resin strand having a multilayer structure so that mechanical aptitude and quality for a 3D printer can be further improved and to provide the method for modeling a three-dimensional object. Moreover, the present invention is intended to provide the molded resin strand manufacturing method for manufacturing a molded resin strand having a constant strand diameter and a cross-sectional shape close to a true circle.

For accomplishing the above-described goals, the molded resin strand of the present invention is a molded resin strand used for a 3D printer employing fused deposition modeling. The molded resin strand includes a first layer containing thermoplastic resin, and a second layer covering the first layer, containing thermoplastic resin, and exhibiting physical properties different from those of the first layer.

Moreover, the three-dimensional object modeling method of the present invention is the method for modeling a three-dimensional object by a 3D printer employing fused deposition modeling. In the method, a molded resin strand including a first layer containing thermoplastic resin and a second layer covering the first layer, containing thermoplastic resin, and exhibiting physical properties different from those of the first layer is used as a modeling material. Moreover, the three-dimensional object is modeled in such a manner that melting extrusion is performed with the second layer covering the first layer and that lamination deposition is performed by fusion between adjacent second layers. Alternatively, the three-dimensional object is modeled in such a manner that melting extrusion is performed with the thermoplastic resin of the second layer being melt-mixed with the thermoplastic resin of the first layer and that lamination deposition is performed.

In the molded resin strand and the three-dimensional object modeling method of the present invention, the molded resin strand has a double-layer structure, and therefore, the degree of freedom in material selection is increased. For example, the machine aptitude, the quality, etc. can be ensured in such a manner that the physical properties of the first layer are supplemented with those of the second layer.

In addition, the molded resin strand manufacturing method of the present invention is the method for manufacturing a molded resin strand used for a 3D printer employing fused deposition modeling. The method includes continuously extruding a melt-kneaded resin material from an extruder through a ferrule, and vacuum-sucking the extruded molded resin strand while passing through a sizing device, and then, winding up the molded resin strand after cooling solidification.

In shaping of a tube (a hollow resin molded body), vacuum sizing has been known as the technique of improving diameter accuracy. However, in sizing of a solid molded resin strand, an attempt has not been made to perform vacuum suction. However, as a result of extensive study by the inventor(s) of the present invention, it has been found that even in sizing of the solid molded resin strand, the constant strand diameter and the strand shape close to the true circle can be realized by vacuum suction. This is a finding which has been never obtained before.

According to the present invention, the molded resin strand can be provided, which has the double-layer structure so that the mechanical aptitude and the quality for the 3D printer can be further improved. Similarly, in the three-dimensional object modeling method of the present invention using the molded resin strand, a high-quality modeled object (a high-quality three-dimensional object) can be produced.

Moreover, according to the molded resin strand manufacturing method of the present invention, the molded resin strand manufacturing method can be provided, which can manufacture the molded resin strand having the constant strand diameter and the cross-sectional shape close to the true circle. For example, such a molded resin strand is used as the modeling material of the three-dimensional object so that high-accuracy modeling can be realized.

DETAILED DESCRIPTION

Figure 1:
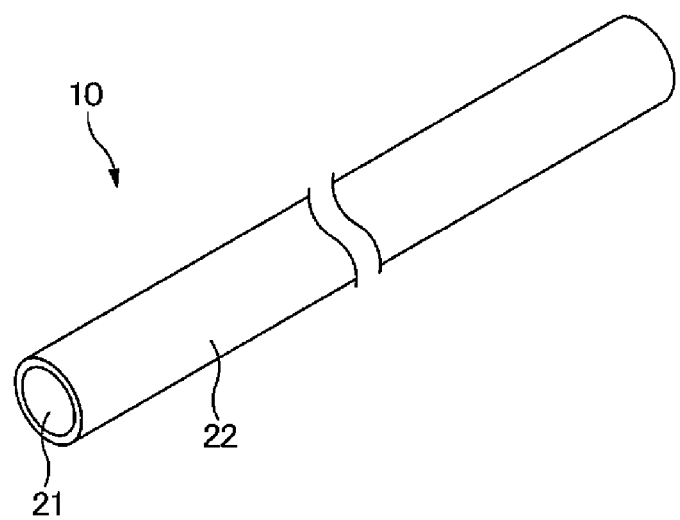
FIG. 1 is a perspective view of a molded resin strand of an embodiment of the present invention.

A mode (hereinafter referred to as an "embodiment") for implementing the present invention will be described below in detail with reference to the attached drawings. The same reference numerals are used to represent equivalent elements throughout entire description of the embodiment. Moreover, each figure is viewed in the direction of reference numerals.

First, an outline of a 3D printer will be briefly described. In a basic structure of such a 3D printer, a cubic object, i.e., a three-dimensional (3D) object, is produced in such a manner that cross-sectional shapes are laminated using, as a design drawing, 3D data produced by a computer. Such a method includes, for example, ink jetting, binder jetting, and fused deposition modeling. In ink jetting, resin in a liquid form is hardened little by little by irradiation with, e.g., ultraviolet light. In binder jetting, an adhesive is sprayed onto resin powder. In fused deposition modeling, thermally-melted resin is stacked up little by little. A molded resin strand of the present embodiment is used for fused deposition modeling, and is supplied to the 3D printer with the molded resin strand being wound around a reel, for example.

Figure 2:
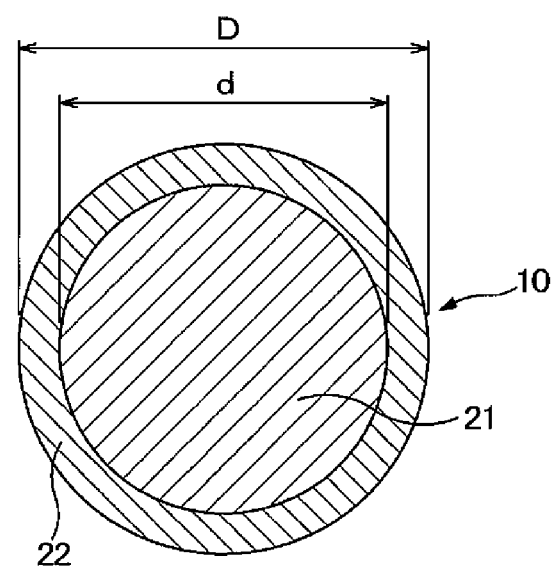
FIG. 2 is a cross-sectional view of the molded resin strand illustrated in FIG. 1.

Next, a configuration of the molded resin strand of the present embodiment will be described with reference to FIGS. 1 and 2. As illustrated in FIG. 1, a molded resin strand 10 is a modeling material used for the 3D printer employing fused deposition modeling. The molded resin strand 10 includes a first layer 21 and a second layer 22. The second layer 22 covers the first layer 21, and contains thermoplastic resin exhibiting a material quality different from that of the first layer 21 or exhibiting physical properties different from those of the first layer 21.

The first layer 21 is formed in a columnar shape, and contains thermoplastic resin. For example, acrylonitrile-butadiene-styrene copolymer (ABS resin) can be preferably used as the thermoplastic resin.

The second layer 22 is formed in a cylindrical shape to cover the first layer 21. The molded resin strand is melt-softened with the second layer 22 covering the first layer 21. The molded resin strand is melt-extruded from an extruding head of the 3D printer with a covering state being maintained. A 3D model is modeled in such a manner that second layers are laminated/deposited with adjacent second layers being fused together. As long as the thermoplastic resin forming the first and second layers of the molded resin strand of the present invention is an extrudable material, the thermoplastic resin can be optionally selected according to a function provided to the molded resin strand. For example, the following materials may be preferably used in addition to the acrylonitrile-butadiene-styrene copolymer (ABS resin): amorphous resin such as polystyrene, polyvinyl chloride, polymethylmethacrylate, polycarbonate, and modified polyphenylene ether; polyolefin resin such as polyethylene and polypropylene; crystalline resin such as polyester, polyamide, and polyvinyl alcohol; olefin-based, styrene-based, and polyester-based thermoplastic elastomers; and a mixture thereof. Further, inorganic additives, antioxidants, lubricants, and colorants such as carbon black, carbon fibers, glass fibers, talc, mica, nanoclay, and magnesium can be optionally mixed.

When the first layer 21 is soft, the second layer 22 is relatively made of a hard material. The second layer 22 has the function of protecting the first layer 21 to prevent bending of the first layer 21. For example, in a case where the first layer 21 is made of styrene-based elastomer, the second layer 22 is made of the hard acrylonitrile-butadiene-styrene copolymer (ABS resin). By the hard second layer 22, bending of the soft first layer 21 is reduced. With this configuration, the molded resin strand 10 has, as a whole, more suitable hardness as compared to that of a molded resin strand made only of elastomer, and therefore, is easily used. Thus, the molded resin strand 10 can exhibit a favorable mechanical aptitude for the 3D printer.

When the first layer 21 is hard, the second layer 22 is relatively made of a soft material. The second layer 22 has the function of protecting the first layer 21 to prevent damage of the first layer 21 due to bending. Suppose that the first layer 21 is made of a material obtained by mixing an inorganic additive (carbon fibers, glass fibers, talc, mica, nanoclay, magnesium, etc.) with the acrylonitrile-butadiene-styrene copolymer (ABS resin). In this case, the second layer 22 is made of the acrylonitrile-butadiene-styrene copolymer (ABS resin) containing no inorganic additive. By the soft second layer 22, damage or rapture of the hard brittle first layer 21 due to bending is reduced.

Moreover, the second layer 22 can be made of a material containing water vapor barrier resin. In this case, the second layer 22 protects the first layer 21 to prevent moisture absorption of the first layer 21. In this embodiment, the following materials can be, for example, used as the water vapor barrier resin: polyolefin-based resin such as polyethylene and polypropylene; and the acrylonitrile-butadiene-styrene copolymer (ABC resin) mixed with an inorganic additive such as carbon fibers, talc, mica, nanoclay, or magnesium. As described above, the second layer 22 is made of the material containing the water vapor barrier resin. This can suppress the molded resin strand 10 in use for the 3D printer from absorbing water vapor from the air even in a case where thermoplastic resin exhibiting high moisture absorbency, such as the acrylonitrile-butadiene-styrene copolymer (ABC resin), is used for the first layer 21 of the molded resin strand 10. Thus, deterioration of the molded resin strand 10 due to moisture absorption can be reduced. In this light, the rate (g/m2·24 h) of permeability of water vapor of the material containing the water vapor barrier resin is equal to or lower than 30, preferably equal to or lower than 10, and more preferably equal to or lower than 3.0 (as converted using 25° C., 90% RH, and a thickness of 25 μm).

Moreover, high-MFR (JIS K 7210 under a condition of 210° C.) thermoplastic resin having a low viscosity and a high fluidity can be used for the second layer 22. In this case, a surface appearance of a modeled object is improved, and a smooth modeled object having a surface with less raised-recessed portions can be produced. Further, even in this case, the first layer 21 as a core layer of the molded resin strand (a filament) is made of thermoplastic resin having a relatively-lower MFR than that of the thermoplastic resin of the second layer 22, and therefore, the mechanical aptitude for the 3D printer is maintained. Thus, modeling without stretching and disconnection of the filament can be realized. Specifically, the MFR of the thermoplastic resin used for the second layer 22 is 5.0 to 70 g/10 min., and preferably 10 to 60 g/10 min. On the other hand, the MFR of the thermoplastic resin used for the first layer 21 is 0.1 to 5 g/10 min., and preferably 0.3 to 2.0 g/10 min.

By mixing a conductive additive such as defective carbon black with the second layer 22, a three-dimensional object exhibiting conductivity of an outer layer of the molded resin strand can be modeled. In this case, the thermoplastic resin forming the first layer 21 has a relatively-higher electric resistivity than that of the thermoplastic resin forming the second layer.

In the case of providing functionality such as a high viscosity or sufficient conductivity to the outer layer of the molded resin strand, an outer layer ratio is set to 5 to 25% so that unavailability of modeling of an expected shape due to dripping of the thermoplastic resin of the second layer forming the outer layer in modeling can be prevented. Moreover, the used amount of carbon black etc. added to the second layer for providing conductivity can be reduced to the minimum necessary.

The outer layer ratio described herein can be obtained by a ratio of the four-point average of the thickness of the second layer as the outer layer to the average diameter of the maximum and minimum diameters in a vertical cross-section of the molded resin strand at an optional position. The four-point average thickness of the outer layer is calculated as the average of the total of four points, i.e., two lengths of segments overlapping with the second layer at both ends of a segment corresponding to the maximum diameter of the molded resin strand and two lengths of segments overlapping with the second layer at both ends of a segment perpendicular to the segment corresponding to the maximum diameter. The outer layer ratio is a value obtained in such a manner that the four-point average thickness value of the second layer as the outer layer in percentage is divided by the average diameter of the molded resin strand.

In the case of modeling the three-dimensional object, when the outer layer ratio of the molded resin strand having a double-layer configuration is lower than 5%, the second layer as the outer layer might be disconnected after modeling, and the first layer might be exposed. In this case, the function of the second layer cannot be obtained. On the other hand, when the outer layer ratio is equal to or higher than 35%, the function of the first layer as an inner layer is not exerted, and a function provided by a multi-layer configuration cannot be obtained. Note that the thickness of the second layer is decreased so that the blending amount of the conductive additive such as carbon black can be reduced.

Note that the first layer 21 and the second layer 22 can be made of a material containing various additives such as an antioxidant or a lubricant.

The outer diameter dimensions of the first layer 21 and the second layer 22 can be optionally set according to required specifications. The outer diameter dimensions include an example where the outer diameter d (see FIG. 2) of the first layer 21 is 1.35 mm±0.2 mm and the outer diameter D (see FIG. 2) of the second layer 22 is 1.75 mm±0.1 mm.

The list of the configuration examples of the double-layer molded resin strand of the present invention as described so far is as follows:

(1) the resin pre-strand body configured such that the second layer covers the first layer to prevent bending when the second layer is hard and the first layer is soft;

(2) the molded resin strand configured such that the second layer covers the first layer to prevent damage due to bending when the second layer is soft and the first layer is hard;

(3) the molded resin strand configured such that the second layer contains the water vapor barrier resin and that the second layer covers the first layer to prevent moisture absorption of the first layer;
(4) the molded resin strand configured such that the thermoplastic resin forming the first layer has a relatively-higher viscosity than that of the thermoplastic resin forming the second layer and that the second layer covers the first layer with an outer layer ratio of 5 to 25% to prevent dripping in shaping;
(5) the molded resin strand configured such that the thermoplastic resin forming the first layer has a relatively-higher electric resistivity than that of the thermoplastic resin forming the second layer and that the second layer covers the first layer with an outer layer ratio of 5 to 25% to obtain sufficient conductivity of the outer layer of the molded resin strand;
(6) the molded resin strand configured such that the thermoplastic resin forming at least one of the first and second layers is the acrylonitrile-butadiene-styrene copolymer (ABS resin) in any of the configurations (1) to (5); and
(7) the molded resin strand configured such that the first layer has an outer diameter of 0.5 to 1.8 mm, the second layer has an outer diameter of 1.1 to 2.2 mm, and the outer layer ratio of the double-layer molded resin strand is 5 to 35% in any of the configurations (1) to (6).

Next, specific configuration examples of the molded resin strand to which the present invention is applied will be described. As described above, in the double-layer molded resin strand of the present invention, the material of each layer is selected according to, e.g., a use application and required performance. As a result, the molded resin strand exhibiting excellent mechanical aptitude and quality can be realized.

For example, when the thermoplastic resin is used alone for the molded resin strand, the molded resin strand might lack mechanical strength (stiffness). However, the strength can be reinforced by blending of the inorganic filler.

An inorganic filler in a fiber form and an inorganic filler in a powder form can be used as the inorganic filler, and an optional material can be used as the material of the inorganic filler. Examples of the inorganic filler include carbon fibers, glass fibers (glass wool etc.), talc, nanoclay, calcium carbonate, and magnesium carbonate. Carbon fibers are preferable because of light weight and a high effect of strength improvement by addition.

The additive amount of the inorganic filler may be set according to, e.g., required mechanical properties. The additive amount of the inorganic filler is preferably 10% by mass to 40% by mass, and more preferably 20% by mass to 30% by mass. When the blending amount of the inorganic filler is less than 10% by mass, there is a probability that an effect (e.g., stiffness improvement) by blending of the inorganic filler is insufficient. Conversely, when the blending amount of the inorganic filler is an extremely-great amount exceeding 40% by mass, the percentage of the thermoplastic resin is relatively too low. Thus, there is a probability that modeling is difficult.

Note that in a case where the inorganic filler is blended with the thermoplastic resin, when the molded resin strand is formed into the modeled object, tendency shows that interlayer fusion is insufficient. This leads to a lower mechanical aptitude (stiffness) as the modeled object. For this reason, the second layer not blended with the inorganic filler and made only of the thermoplastic resin covers the periphery of the first layer blended with the inorganic filler. With this configuration, the molded resin strand having a high mechanical strength (stiffness) and exhibiting favorable interlayer fusion can be realized.

Specifically, it can be said that a molded resin strand configured such that a first layer is made of acrylonitrile-butadiene-styrene copolymer (ABS resin) blended with carbon fibers and that a second layer is made of acrylonitrile-butadiene-styrene copolymer (ABS resin) not blended with carbon fibers is a preferable form. This leads to a high mechanical strength (stiffness) and favorable interlayer fusion. Due to blending of the carbon fibers, a phenomenon that a nozzle is scraped in melting extrusion in the 3D printer is caused. However, by coverage with the acrylonitrile-butadiene-styrene copolymer (ABS resin) not blended with the carbon fibers, scraping of the nozzle is reduced.

Note that the phase of "thermoplastic resin not blended with the inorganic filler (containing no inorganic filler) means thermoplastic resin not substantially containing an inorganic filler, and does not intended to exclude thermoplastic resin containing a slight amount of inorganic filler. For example, the thermoplastic resin of the second layer may contain an inorganic filler of less than 3% by mass. Note that the content of the inorganic filler in the thermoplastic resin of the second layer is preferably less than 1% by mass.

Examples of the molded resin strand with the above-described configuration (3) include a molded resin strand configured such that a first layer is made of acrylonitrile-butadiene-styrene copolymer (ABS resin) and that a second layer is made of polyolefin (or modified polyolefin) such as polypropylene (or modified polypropylene) or polyethylene (or modified polyethylene). Acrylonitrile-butadiene-styrene copolymer (ABS resin) exhibits moisture absorbency, and tends to deteriorate after long-term storage, for example. Polypropylene exhibits barrier properties against water vapor. Thus, by coverage with the second layer made of polypropylene, deterioration of the first layer (the ABS resin) can be reduced. Note that, the second layer is preferably made of modified polypropylene or modified polyethylene, considering adhesion to the acrylonitrile-butadiene-styrene copolymer (ABS resin) of the first layer. In this embodiment, optional commercially-available materials can be used as modified polypropylene and modified polyethylene. Examples of these materials include a product name of MODIC F534A manufactured by Mitsubishi Chemical Corporation and a product name of ADMER SF600 manufactured by Mitsui Chemicals, Inc.

In addition, e.g., a molded resin strand configured such that a first layer is made of thermoplastic resin containing a colorant and a second layer is made of transparent thermoplastic resin, and a molded resin strand configured such that a first layer is made of low-MFR thermoplastic resin and a second layer is made of high-MFR thermoplastic resin are also specific examples of preferable molded resin strands of the present invention. In the former case, a touch of class can be added to an outer appearance of a modeled object. In the latter case, a surface shape of a modeled object can be smoothed.

In the method for modeling the three-dimensional object by the 3D printer employing fused deposition modeling, the above-described molded resin strand is used as a modeling material, and is melt-extruded to form a cubic object. In this method, the three-dimensional object is normally modeled in such a manner that melting extrusion is performed with the second layer covering the first layer and that lamination deposition is performed by fusion between adjacent second layers. When the second layer can be made of resin having a beneficial effect on thermal fusion, a favorable fusion state can be realized, leading to formation of a highly-reliable three-dimensional object.

Alternatively, the three-dimensional object may be modeled in such a manner that melting extrusion is performed with the thermoplastic resin of the second layer being mixed with the thermoplastic resin of the first layer and lamination deposition is performed. For example, in the case of a molded resin strand configured such that a second layer is made of resin (e.g., polypropylene) exhibiting water vapor barrier properties, it is effective to prevent, for storage, deterioration by coverage with the second layer. Note that in modeling, coverage with the second layer is not necessarily made. In this case, e.g., a nozzle having a significantly smaller inner diameter than the diameter of the molded resin strand is used to extremely stretch the second layer, and therefore, the second layer is extruded with the second layer being melt-mixed with the first layer. In this manner, a three-dimensional object made of a resin mixture is modeled.

Next, an embodiment of the molded resin strand manufacturing method (a manufacturing line) to which the present invention is applied will be described.

Figure 3:
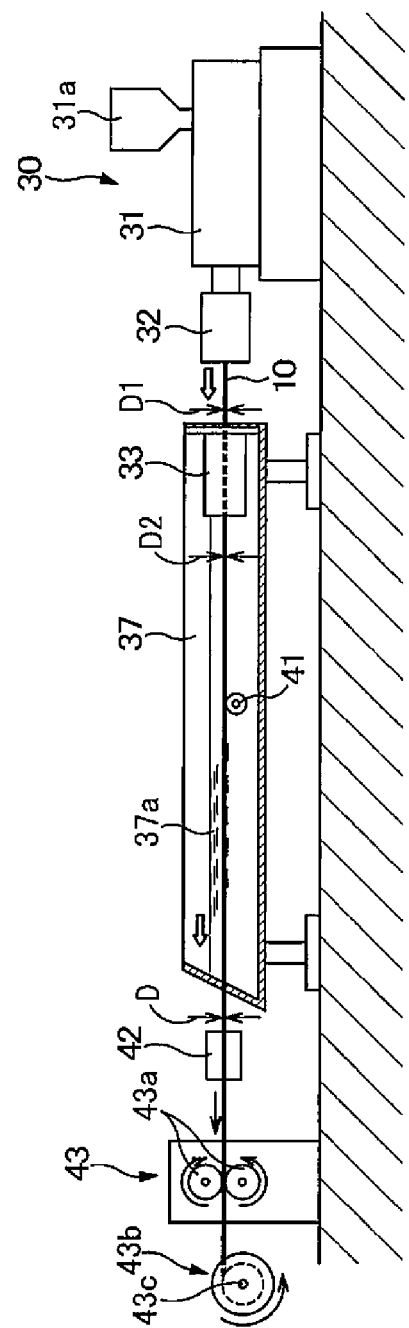
FIG. 3 is a side view of a device configured to manufacture the molded resin strand.

As illustrated in FIG. 3, a manufacturing line 30 of a molded resin strand 1 of the present embodiment includes an extruder 31, a mold 32, a sizing device 33, a water tank 37, a fixed roller 41, an outer diameter dimension measurement device 42, and a wind-up device 43.

The extruder 31 is configured to melt-knead a raw resin material composition, thereby continuously supplying the resultant to the mold 32. For example, the extruder 31 is configured to include a cylinder having a built-in screw, a hopper 31a for raw material injection, an ejection nozzle, etc., for example. The raw resin material composition injected from the hopper for raw material injection is melt-kneaded by the screw in the cylinder, and then, is ejected from the ejection nozzle to the mold 32.

The mold 32 is configured to extrude the melted resin from the extruder 31 in the horizontal direction. The extruded melted resin is cooled into the molded resin strand 10. The raw resin material composition is obtained by blending of raw material resin, various additives, etc. according to a use application etc., and an optional material can be selected.

Note that in the case of manufacturing, e.g., the double-layer molded resin strand 10, two types of resin made of different materials may be extruded concentrically. More specifically, the mold 32 extrudes the materials of the first layer 21 and the second layer 22 from two outlets arranged concentrically. In this manner, a continuous body of the molded resin strand 10 with the multi-layer structure (the double-layer structure) is formed.

Figure 4:
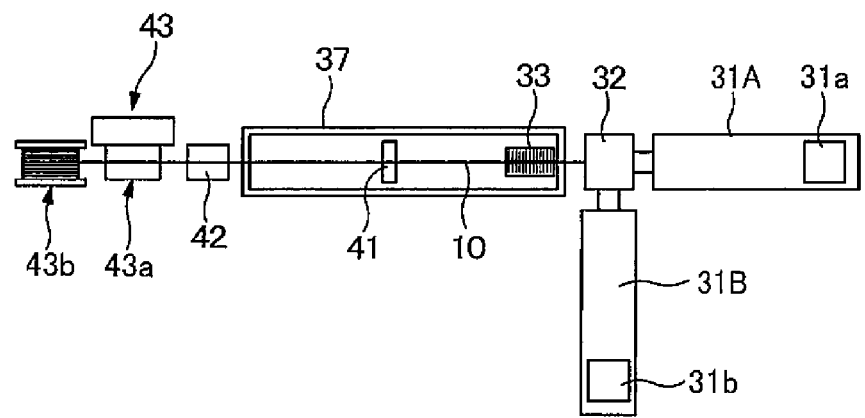
FIG. 4 is a plan view of a device configured to manufacture the molded resin strand with a double-layer configuration.

FIG. 4 illustrates an example of a device used for the case of manufacturing the double-layer molded resin strand 10. In the case of shaping the double-layer molded resin strand 10, two extruders 31A, 31B are arranged perpendicular to each other. For example, the raw resin material composition for forming the first layer is injected from a hopper 31a of the extruder 31A, and then, is melt-extruded to the mold 32. Meanwhile, the raw resin material composition for forming the second layer is injected from a hopper 31b of the extruder 31B, and then, is melt-extruded to the mold 32. The raw resin material compositions extruded from the extruders 31A, 31B join together at the mold 32, and the second layer covers the periphery of the first layer as a core.

Figure 5:
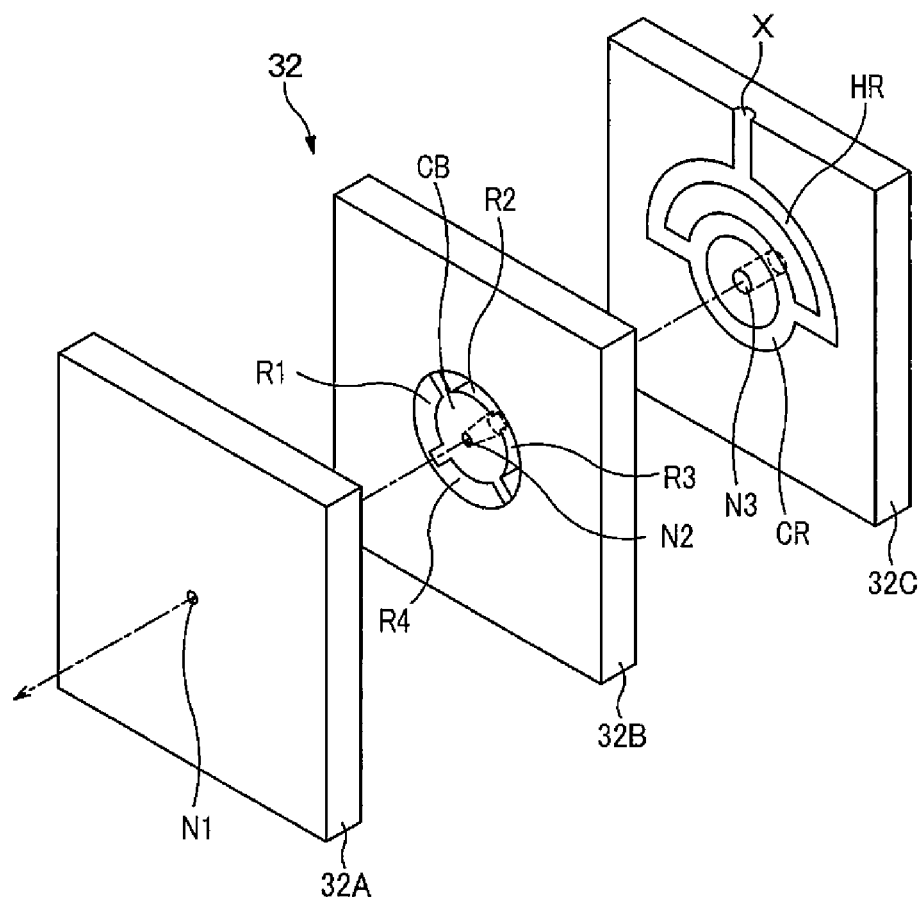
FIG. 5 is an exploded perspective view of a configuration example of a mold used in manufacturing of the molded resin strand with the double-layer configuration.

For example, a multi-layer mold as illustrated in FIG. 5 may be used as the mold 32 used for the case of manufacturing the double-layer molded resin strand 10. The multi-layer mold of the present example is a combination of three mold members 32A, 32B, 32C. The mold members 32A, 32B, 32C have central channels N1, N2, N3, respectively. The raw resin material composition is formed into a strand by these central channels N1, N2, N3.

Moreover, the mold member 32B has a circular mold portion CB surrounding the central channel N2. Further, the mold member 32B has four through-channels R1, R2, R3, R4 at the periphery of the circular mold portion CB. The through-channels R1, R2, R3, R4 are each formed to penetrate the mold member 32B in a thickness direction thereof. The circular mold portion CB is formed such that the central channel N2 is formed at the center of the circular mold portion CB and that a circular surface is recessed with respect to a molding surface of the mold member 32B.

The mold member 32C has an annular channel CR surrounding the central channel N3. Further, the mold member 32C has a semicircular middle path HR on the outside of the annular channel CR. This semicircular middle path HR is connected to the annular channel CR at 180° symmetrical positions. Further, the mold member 32C has a material supply path X connected to a single point of the middle path HR. The annular channel CR faces the through-channels R1, R2, R3, R4 of the mold member 32B.

In the mold 32 as the combination of the three mold members 32A, 32B, 32C, the raw resin material composition for forming the first layer 21 is extruded from the extruder 31A, and then, is supplied to the central channel N3 of the mold member 32C. The raw resin material composition is further drawn from the mold 32 by way of the central channel N2 of the mold member 32B and the central channel N1 of the mold member 32A. Meanwhile, the raw resin material composition for forming the second layer 22 is extruded from the extruder 31B, and then, is supplied to the material supply path X of the mold member 32C. This supplied raw resin material composition flows into the annular channel CR through the semicircular middle path HR, and then, is supplied to the through-channels R1, R2, R3, R4 of the mold member 32B provided facing the annular channel CR. The raw resin material supplied to the through-channels R1, R2, R3, R4 flows into a space between a molding surface of the mold member 32A and the circular mold portion CB formed recessed from such a molding surface, and then, covers the periphery of the first layer 21 drawn from the central channel N2 provided at the circular mold portion CB. Since the raw resin material is supplied to the above-described space from the through-channels R1, R2, R3, R4 continuous in an annular shape, occurrence of a weld line can be suppressed to the minimum.

The water tank 37 is formed in a box shape elongated along a conveyance direction of the molded resin strand 10 extruded from the extruder 31. The molded resin strand 10 is injected into the water tank 37 from one end wall of the water tank 37, and is ejected from the other end wall of the water tank 37. Water 37a is stored in the water tank 37. The molded resin strand 10 is dipped in the water 37a, and is cooled by the water 37a.

The sizing device 33 is disposed inside one end wall of the water tank 37. The sizing device 33 has the function of forming, into a true circle shape, a cross section of the molded resin strand 10 sent into the water tank 37 from the extruder 31 and uniformizing the outer diameter dimension of the molded resin strand 10 to a predetermined dimension.

A big feature in the case of the present embodiment is that vacuum suction is performed at the sizing device 33. That is, the shape and diameter of the molded resin strand 10 are adjusted to some degree by passage through the sizing device 33 provided with a space having a circular cross section. However, it is not sufficient. For this reason, such adjustment is promoted by vacuum suction in the present embodiment.

Figure 6:
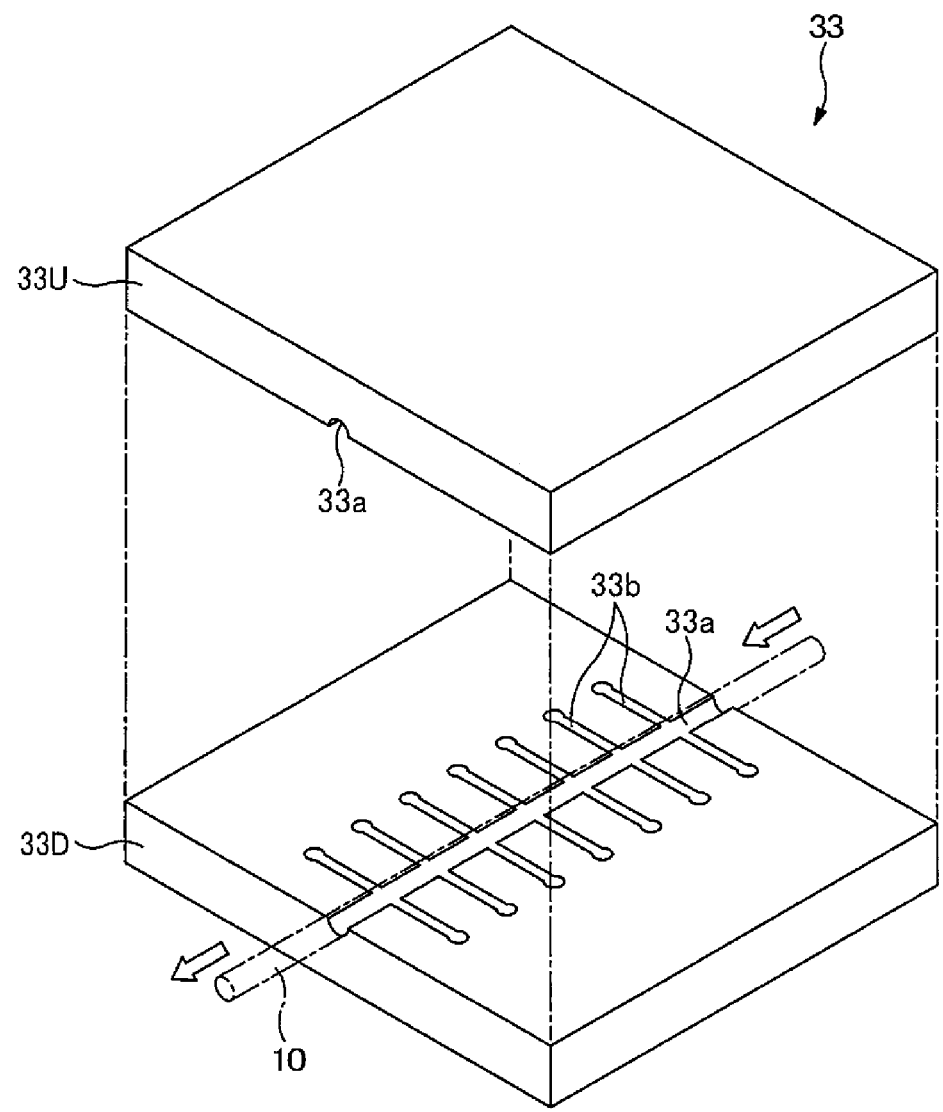
FIG. 6 is an exploded perspective view of a sizing device of the device illustrated in FIG. 3.
Figure 7:
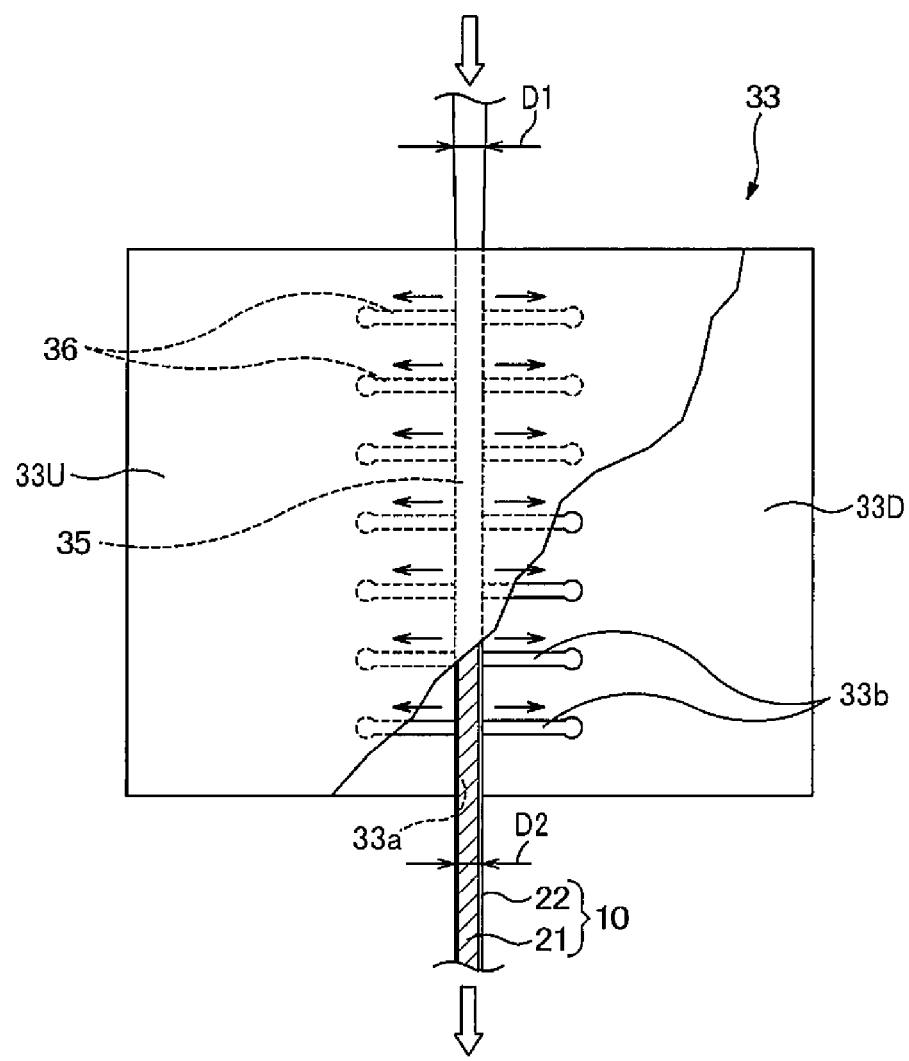
FIG. 7 is a plan view of the sizing device of the device illustrated in FIG. 3, the plan view illustrating the sizing device with an upper member being partially cut away.

As illustrated in FIGS. 6 and 7, the sizing device 33 includes a pair of lower member 33D and upper member 33U. Opposing surfaces of the lower member 33D and the lower member 33D are each provided with a semi-cylindrical first groove 33a and a plurality of second grooves 33b (in this example, seven grooves arranged parallel to each other) for vacuum suction. The first groove 33a is formed along the conveyance direction of the continuous body of the molded resin strand 10, thereby allowing passage of the molded resin strand 10. The second grooves 33b intersect perpendicularly to the first groove 33a. The number of second grooves 33b for vacuum suction is optional. The number of second grooves 33b for vacuum suction may be optionally set such that the shaping accuracy of the molded resin strand 10 after passage through the sizing device 33 is sufficiently favorable. Moreover, the second grooves 33b for vacuum suction can be provided not only in the horizontal direction but also in an optional direction such as the vertical direction and a diagonal direction. Similarly, the direction of the second groove 33b may be optionally set such that the sufficiently-favorable shaping accuracy can be provided.

Since vacuum suction is performed at the sizing device 33, vacuum suction force acts on the molded resin strand 10. As a result, an outer peripheral surface of the molded resin strand 10 is attracted to wall surfaces of the grooves 33a facing the space with the circular cross section, the grooves 33a being provided at the lower member 33D and the upper member 33U. Thus, the outer peripheral surface of the molded resin strand 10 is shaped to have the shape and diameter of the space formed by the grooves 33a. Consequently, a cross section of the molded resin strand 10 having passed through the sizing device 33 is substantially in the true circle shape, and the diameter thereof is a constant value substantially coincident with a set value (the diameter of the space).

The fixed roller 41 is configured to stabilize, in the water tank 37, the posture of the molded resin strand 10 having passed through the sizing device 33. Moreover, the fixed roller 41 conveys the molded resin strand 10 toward the wind-up device 43.

The outer diameter dimension measurement device 42 is configured to measure the outer diameter dimension of the molded resin strand 10 cooled in the water tank 37. The wind-up device 43 includes a pair of upper and lower wind-up rollers 43a and a bobbin winder 43b. The wind-up rollers 43a are configured to convey the molded resin strand 10 to a downstream side in a state in which the wind-up rollers 43a sandwich the molded resin strand 10 having passed through the outer diameter dimension measurement device 42. The bobbin winder 43b is disposed downstream of the wind-up rollers 43a, and has a wind-up shaft 43c around which the molded resin strand 10 is wound up.

Next, the method for manufacturing the molded resin strand 10 by means of the manufacturing line 30 will be described. The method for manufacturing the molded resin strand 10 includes an extrusion step, a sizing step, a cooling step, a dimension measurement step, and a wind-up step.

At the extrusion step as illustrated in FIG. 3, a resin pellet injected from the hopper 31a is melted at the extruder 31, and then, the melted resin is extruded from the mold 32. In this state, the first layer 21 is extruded while the second layer 22 is being extruded to cover the first layer 21. In this manner, the multi-layer molded resin strand 10 is extruded. In this example, the molded resin strand 10 having an outer diameter (indicated by a reference numeral "D1") of 2.2 mm is extruded from the mold 32.

At the sizing step as illustrated in FIGS. 6 and 7, the molded resin strand 10 travels, in the sizing device 33, along a conveyance path 35 formed by the upper and lower first grooves 33a. At the same time, the molded resin strand 10 is vacuum-sucked by a suction path 36 formed by the plurality of upper and lower second grooves 33b. This can form the molded resin strand 10 having a uniform outer diameter matching the inner diameter of the conveyance path 35. In this example, after the molded resin strand 10 having an outer diameter D1 of 2.2 mm has passed through the sizing device 33, the outer diameter of the molded resin strand 10 is uniformized to an outer diameter (indicated by a reference numeral "D2") of 1.80 mm in the conveyance direction.

At the cooling step, the molded resin strand 10 having an outer diameter (indicated by the reference numeral "D2") of 1.80 mm is cooled when passing through the water tank 37, and the outer diameter (indicated by a reference character "D") of the molded resin strand 10 is narrowed to 1.75 mm.

At the dimension measurement step, the outer diameter of the molded resin strand 10 is measured, and it is determined whether or not a measurement value is suitable. In this example, it is determined whether or not the outer diameter of the molded resin strand 10 falls within a predetermined standard width range of around 1.75 mm. In a case where the outer diameter of the molded resin strand 10 is outside the standard width range, each manufacturing condition is reviewed such that the outer diameter falls within the standard width range.

At the wind-up step, in a case where the outer diameter of the molded resin strand 10 falls within the standard width range, the continuous body of the molded resin strand 10 is sent to the bobbin winder 43b by the wind-up rollers 43a of the wind-up device 43, and is wound up around the wind-up shaft 43c. When a predetermined length of the molded resin strand 10 is wound up around the wind-up shaft 43c, the molded resin strand 10 is wound up around another wind-up shaft 43c.

The molded resin strand 10 manufactured by the above-described manufacturing line is vacuum-sucked at the sizing device 33, and therefore, has a cross-sectional shape close to a true circle with a constant strand diameter. For example, such a molded resin strand 10 is used as a raw material of the three-dimensional object so that high-accuracy modeling can be realized.

Note that the manufacturing method of the present invention provides a great effect when applied to manufacturing of the molded resin strand containing the inorganic filler. The molded resin strand 10 containing the inorganic filler tends to show greater variation in the strand diameter right after extrusion from the extruder at the extrusion step as compared to the molded resin strand 10 containing no inorganic filler. Even in the case of the molded resin strand 10 containing the inorganic filler and showing great variation in the strand diameter after extrusion, such a molded resin strand 10 can have the constant cross-sectional shape close to the true circle by passage through the sizing device 33 at the sizing step. That is, in a case where the molded resin strand 10 contains the inorganic filler, a higher effect of stabilizing the strand diameter by vacuum suction at the sizing device 33 can be obtained. Examples of the inorganic filler described herein include the inorganic fillers listed as the above-described specific configuration examples of the double-layer molded resin strand.

Specific examples of the molded resin strand manufacturing method to which the present invention is applied will be described below based on experimental results.

First Example

Melted resin was melt-kneaded at an extruder, and then, was supplied and ejected to a die core. Subsequently, the melted resin was drawn from a ferrule provided at the die core. At this ferrule, the strand diameter and shape were adjusted to some degree, and a molded resin strand was shaped. Thereafter, the final cross-sectional shape (the strand diameter and shape) of the molded resin strand was adjusted at a sizing unit provided at an inlet of a water tank for cooling solidification. In this state, shaping was performed by vacuum suction at the sizing unit. Subsequently, winding up by the winder was performed after cooling solidification at the water tank. Further, the molded resin strand sent out of the winder was wound up around a bobbin.

First Comparative Example

A first comparative example is the same as the first example, except that sizing is not provided at the inlet of the water tank for cooling solidification.

Evaluation

The diameter and shape of the molded resin strands produced in the first example and the first comparative example were measured and evaluated.

(Strand Dimeter)

For the molded resin strands molded in the first example and the first comparative example, the strand diameters were measured using a digimatic caliper (NTD25-20CX manufactured by Mitsutoyo Corporation). After each molded resin strand has been left to stand at a room temperature of 23° C. for one day, the average of the maximum and minimum diameters of the molded resin strand measured at ten measurement points at equal intervals of 10 cm was calculated.

(Strand Shape)

For the shapes of the molded resin strands molded in the first example and the first comparative example, the diameters of the longest and shortest cross-sectional portions at the above-described ten measurement points were measured by cross-sectional shape observation using a digital microscope (VHX-900 manufactured by Keyence Corporation). Then, a roundness was calculated from the following expression:

Roundness (%)=(Minimum Length/Maximum Length)×100

Measurement results of the first example are shown in Table 1. Measurement results of the first comparative example are shown in Table 2.

TABLE 1

| Measurement Position | Strand Diameter | | Strand Shape Roundness (%) |
|---|---|---|---|
| | Minimum Diameter | Maximum Diameter | |
| 1 | 1.720 | 1.722 | 99.9 |
| 2 | 1.732 | 1.734 | 99.9 |
| 3 | 1.748 | 1.766 | 99.0 |
| 4 | 1.728 | 1.734 | 99.7 |

TABLE 1-continued

| Measurement Position | Strand Diameter | | Strand Shape Roundness (%) |
|---|---|---|---|
| | Minimum Diameter | Maximum Diameter | |
| 5 | 1.766 | 1.799 | 98.2 |
| 6 | 1.740 | 1.748 | 99.5 |
| 7 | 1.754 | 1.764 | 99.4 |
| 8 | 1.724 | 1.740 | 99.1 |
| 9 | 1.736 | 1.738 | 99.9 |
| 10 | 1.720 | 1.722 | 99.9 |
| AVE | 1.737 | 1.747 | 99.4 |
| Standard Deviation | 0.015 | 0.023 | 0.5 |

TABLE 2

| Measurement Position | Strand Diameter | | Strand Shape Roundness (%) |
|---|---|---|---|
| | Minimum Diameter | Maximum Diameter | |
| 1 | 1.369 | 1.538 | 89.0 |
| 2 | 1.299 | 1.616 | 80.4 |
| 3 | 1.290 | 1.556 | 82.9 |
| 4 | 1.305 | 1.624 | 80.4 |
| 5 | 1.234 | 1.558 | 79.2 |
| 6 | 1.288 | 1.586 | 81.2 |
| 7 | 1.303 | 1.646 | 79.2 |
| 8 | 1.270 | 1.566 | 81.1 |
| 9 | 1.234 | 1.570 | 78.6 |
| 10 | 1.341 | 1.618 | 82.9 |
| AVE | 1.293 | 1.588 | 81.5 |
| Standard Deviation | 0.040 | 0.034 | 2.9 |

(Overview of Advantageous Effects)

As will be clearly seen from the measurement results shown in Tables 1 and 2, it has been found that the strand diameter and shape in the first example show favorable performance. For example, the strand shape (the roundness) is preferably equal to or higher than 98% (98 to 100%). The first example sufficiently satisfies this condition. On the other hand, it has been found that both of the strand diameter and shape in the first comparative example do not show favorable performance as the molded resin strand due to great variation.

As will be clearly seen from the above-described evaluation results, the molded resin strand having the cross-sectional shape with the constant strand diameter and the strand shape close to the true circle can be manufactured by vacuum suction at the sizing unit. For example, such a molded resin strand is used as the raw material of the three-dimensional object so that high-accuracy modeling can be realized.

The embodiment to which the present invention is applied has been described above. Needless to say, the present invention is not limited to the above-described embodiment. Various changes can be made to the above-described embodiment without departing from the gist of the present invention.

The invention claimed is:

1. A molded resin strand used for a 3D printer employing fused deposition modeling, consisting of:
   a first layer consisting of thermoplastic resin and an inorganic filler in a powder form selected from the group consisting of talc, nanoclay, calcium carbonate, and magnesium carbonate; and
   a second layer covering the first layer, formed of a second resin composition consisting of thermoplastic resin, the second layer exhibiting a physical property different from that of the first layer, wherein
an amount of the inorganic filler contained in the first layer is 10% by mass to 40% by mass.

2. The molded resin strand according to claim 1, wherein the first layer contains the inorganic filler, and the second layer contains no inorganic filler.

3. The molded resin strand according to claim 1, wherein when the second layer is hard and the first layer is soft, the second layer covers the first layer to prevent bending of the first layer.

4. The molded resin strand according to claim 1, wherein when the second layer is soft and the first layer is hard, the second layer covers the first layer to prevent damage of the first layer due to bending.

5. The molded resin strand according to claim 1, wherein the second layer contains water vapor barrier resin, and covers the first layer to prevent moisture absorption of the first layer.

6. The molded resin strand according to claim 1, wherein the thermoplastic resin forming the first layer has a relatively-higher viscosity as compared to that of the thermoplastic resin forming the second layer, and the second layer covers the first layer with an outer layer ratio of 5 to 25% to prevent dripping of the second layer in modeling.

7. The molded resin strand according to claim 1, wherein the thermoplastic resin forming the first layer has a relatively-higher electric resistivity as compared to that of the thermoplastic resin forming the second layer, and the second layer covers the first layer with an outer layer ratio of 5 to 25% to obtain sufficient conductivity at an outer layer of the molded resin strand.

8. The molded resin strand according to claim 1, wherein the thermoplastic resin forming at least one of the first and second layers is acrylonitrile-butadiene-styrene copolymer (ABS resin).

9. The molded resin strand according to claim 1, wherein the first layer has an outer diameter of 0.5 to 1.8 mm, the second layer has an outer diameter of 1.1 to 2.2 mm, and
an outer layer ratio of the double-layer molded resin strand is 5 to 35%.

* * * * *